United States Patent
Bors

[19]

[11] Patent Number: 5,961,274
[45] Date of Patent: Oct. 5, 1999

[54] INSTALLATION FOR STACKING PLATE-LIKE ELEMENTS

[75] Inventor: Cornelis Johannes Maria Bors, Venlo, Netherlands

[73] Assignee: Boral B.V., Tegelen, Netherlands

[21] Appl. No.: 08/915,700

[22] Filed: Aug. 21, 1997

[30] Foreign Application Priority Data

Aug. 21, 1996 [NL] Netherlands ............................ 1003847

[51] Int. Cl.⁶ .................................................. B65G 57/06
[52] U.S. Cl. .................. 414/791; 414/793.4; 414/789.6; 414/794.2
[58] Field of Search ................................ 414/793.4, 791, 414/789.6, 794.2, 794.9

[56] References Cited

U.S. PATENT DOCUMENTS

| | | | |
|---|---|---|---|
| 3,785,508 | 1/1974 | Hayden | 414/789.6 |
| 4,712,975 | 12/1987 | Salts . | |
| 4,927,000 | 5/1990 | Hoyland et al. | 414/791 |
| 4,938,657 | 7/1990 | Benson et al. . | |
| 5,006,040 | 4/1991 | Frey | 414/791 |
| 5,476,361 | 12/1995 | Uno | 414/794.2 |
| 5,605,433 | 2/1997 | Tanaka | 414/793.4 |

FOREIGN PATENT DOCUMENTS

| | | |
|---|---|---|
| 0 688 730 A1 | 12/1995 | European Pat. Off. . |
| 23 57 658 | 5/1975 | Germany . |
| 3736868A1 | 5/1989 | Germany . |
| 1120471 | 7/1968 | United Kingdom . |

Primary Examiner—Christopher P. Ellis
Assistant Examiner—Douglas Hess
Attorney, Agent, or Firm—Helfgott & Karas, P.C.

[57] ABSTRACT

In an installation for stacking plate-like elements, in particular fibre plates, supplied on an infeed conveyor, a compact construction and rapid and reliable processing are obtained by a controlled level switch which takes an infed element into one of a number of buffer stations which are situated above one another, with downstream thereof a stacking station with a number of stacking units situated above one another, each with a controlled removable support, and below them a receiving support on which the elements, falling over a short distance, land.

17 Claims, 4 Drawing Sheets

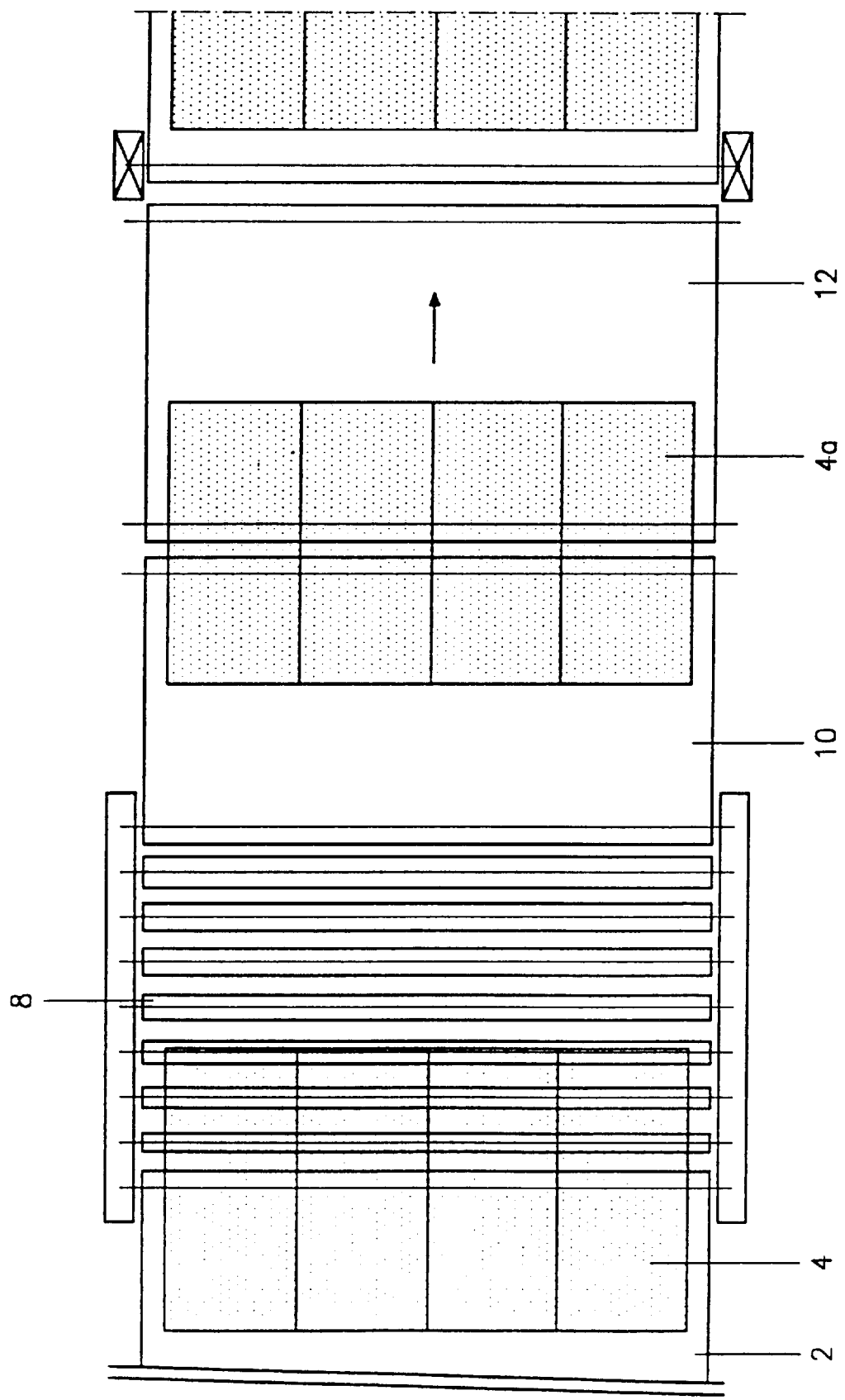

INSTALLATION FOR STACKING PLATE-LIKE ELEMENTS

BACKGROUND OF THE INVENTION

The invention relates to an installation for stacking plate-like elements, in particular fibre plates, with an infeed conveyor supporting the elements.

Such an installation, in particular intended for stacking light elements such as fibre plates (glassfibre plates), is known in practice. It comprises two elongated cylindrical receiving elements, the axes of rotation of which lie parallel to the infeed direction of the plate-like elements, in each of which elements a part bounded by two radial faces is recessed, and which elements are situated above the receiving table on which the plates are to be stacked. An infed plate ultimately lies with each of the two opposite end edges in the recessed cylinder part; as soon as the plate has come to a standstill, the two cylinders are turned through a quarter turn in opposite directions, with the result that the plate is ejected downwards.

The disadvantage of this known stacking installation is that receiving each infed plate, slowing it down and bringing it to a standstill, followed by rotating the two receiving cylinders through 90° takes a certain amount of time, which, of course, limits the infeed speed of the infed plates. If the speed at which individual plates are manufactured is greater than the speed at which the plates for stacking with this known installation can be processed—which is particularly the case with glassfibre plates—the infeed conveyor has to be divided into two or more partial conveyors situated behind one another, each ending in a stacking station of the type described above. It is clear that this not only results in an expensive plant, but also considerably increases the overall area taken up by the plant.

DE-A-3 736 686 shows a stacking device for packets comprising buffer stations but without a level switch. DE 2 44 3781 describes a stacking device for corrugated paper plates with two, mutually independent supply conveyors, one above the other and each with its own stacking station.

SUMMARY OF THE INVENTION

The object of the invention is to overcome these disadvantages and provide an installation of the type mentioned in the preamble which is compact in design and is capable of combining reliably into stacks plate-like elements fed in at high speed, in particular lightweight plates such as fibre plates.

This object is achieved according to the invention by using a controlled level switch which connects to the infeed conveyor and by means of which an infed element can be brought into one of a number of buffer stations which are situated above one another, from which each buffered element can be transferred in a controlled manner to a stacking station with a number of stacking units above one another, each connecting to one of the respective buffer stations, and each with a controlled removable support, and having below them a receiving support for a completed stack of elements, all the above with such control that when infed elements are conveyed by way of the level switch alternately to the respective buffer stations and from there to the respective stacking units, the respective supports of the latter are released in succession.

The infed plates are consequently taken by the installation according to the invention to various vertical levels, from where they are transferred in succession to various stacking units, likewise situated above one another at these levels; if two successive stacking units each contain an element, the respective supports are released in succession, so that a plate situated above falls onto a plate situated below it and from there onto the ultimately formed stack.

With these measures, it is ensured that the individual plates each fall down only over a very short distance, so that during the entire stacking process they follow a well-controlled path and form a stack in a precisely aligned manner. The latter is important in particular if the plate-like elements are fibre plates which can no longer slide relative to the plate below after they have fallen onto the stack, so that the correct mutual orientation prior to the falling movement which ultimately results in the stack is very important. This is achieved by the installation according to the invention.

Preferably, each level switch comprises a conveyor which is guided around two guide rollers situated at a distance from each other, while the downstream end of which conveyor can rotate in the vertical direction about the axis of the guide roller situated at the infeed side.

In a preferred embodiment the element support in a buffer station is formed by first and second endless belts placed alternately next to each other and driven around, the second belts of which are accommodated in a frame which is movable to and fro in the direction of conveyance and by means of which they can be taken into the adjacent stacking unit and in doing so can co-operate for the support of a plate with third endless conveyor belts which are driven around and can be moved to and fro symmetrically relative to the second belts, each buffer station being bounded by a controlled removable stop for the infed elements.

Preferably, the circumferential speed of the second belts in their frame is higher than the speed of said frame during the return movement thereof.

It is preferred that thus there id furthermore a controlled plate support situated between the stacking units and the receiving support and forming a vertical buffer station.

Other objects and features of the invention will become apparent by reference to the following specification and the drawings.

IN THE DRAWINGS

FIGS. 2a and 2b show in combination and diagrammatically a top view of this installation.

Figure 1A:
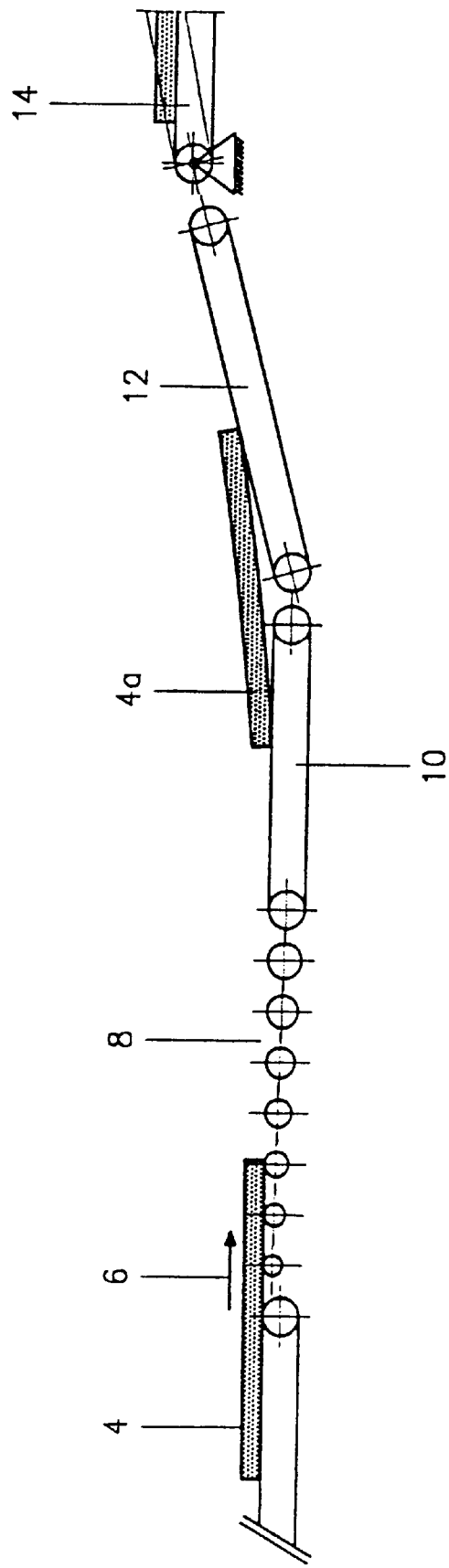
FIGS. 1a and 1b show in combination and diagrammatically a side view of an embodiment of the installation according to the invention.
Figure 1B:
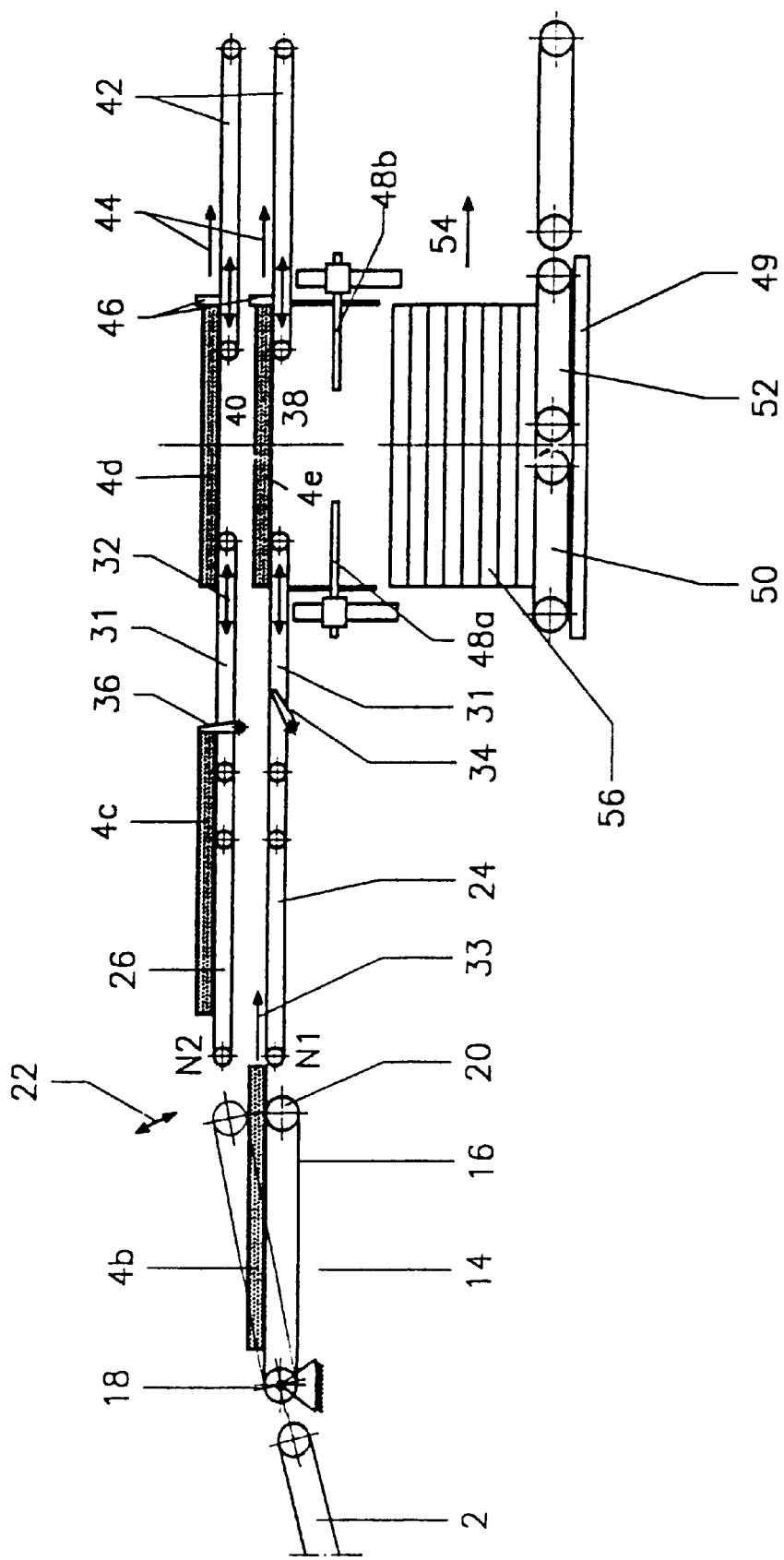
Figure 2B:
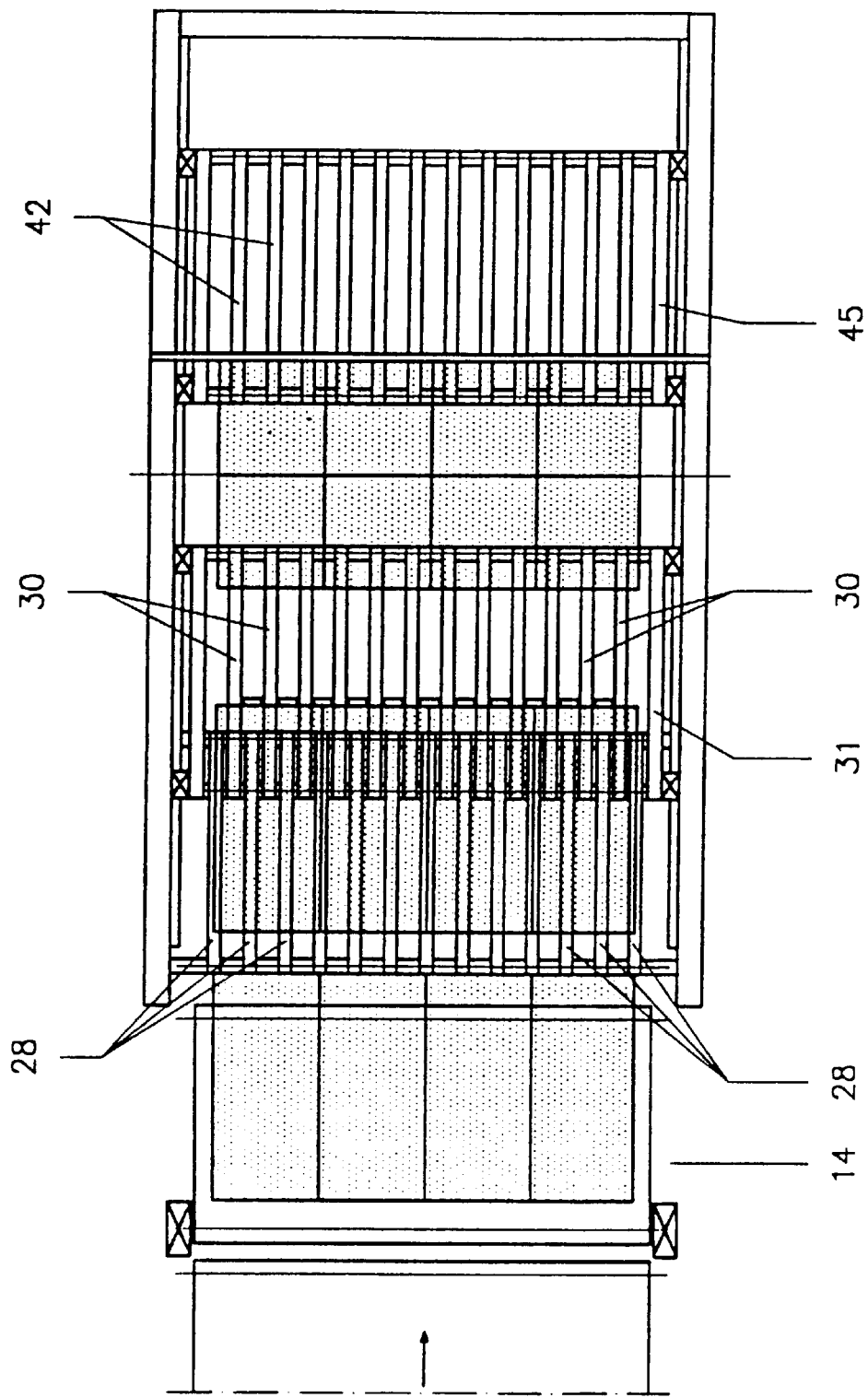

The installation according to the invention is intended for placing downstream of a production line 2, in which plates 4 are formed from a continuous web of starting material, for example fibre material such as glass wool, by cutting parts off said continuous web at right angles to the direction of travel indicated by the arrow 6. In an accelerating roller conveyor 8 the plates 4 reach a higher speed than that at which they were travelling on the production line 2, so that the successive plates acquire a greater mutual distance, as indicated in the figure for the plates 4a, 4b, 4c. By way of two conveyors 10 and 12 connecting to each other, and known per se, the successive plates arrive at a level switch station 14, consisting of a driven endless belt 16 which is guided around the guide rollers 18 and 20. The driving guide roller 18 is in a fixed position, but the guide roller 20 can be moved up and down in a controlled manner in the direction of the arrows 22, with the result that the infed plates, such as the plate 4b, can be taken to one of two different levels, indicated by N1 and N2. The plate buffer station 24 connects to the level N1, and the plate buffer station 26 connects to the level N2. Each of the buffer stations 24, 26 has a very special construction. Each station comprises (see in particular FIG. 1b) a first set of endless belts 28 situated next to each other and at a distance from each other, combined with a second set of endless belts 30, likewise situated at a distance from each other, in such a way that a belt 30 always lies between said belts 28, so that the top surfaces of the belts 28, 30 lie in one plane. The belts 28 are driven around, as are the belts 30, but both for the bottom buffer station 24 and for the top buffer station 26 the latter belts are accommodated in a frame 31 which can be moved to and fro in the direction of the arrows 32. The direction of movement of the belts 28 and 30 is in the direction of the arrow 33—thus in the direction of travel of the plates illustrated—and the peripheral speed of the belts 30 in this direction is higher than the speed at which each frame 31 with the belts 30 can be moved in the direction opposite to that of the arrow 33 (i.e. to the left) so that, even if a frame 31 with the belts 30 is moved back, a resulting driving force in the direction of the arrow 33 always continues to be exerted on a plate resting on the belts. Each station also has a controlled stop 34, 36 which can be taken into the path of the plates, by means of which stop an infed plate, such as the plate 4c, can be stopped.

A bottom stacking unit 38 and a top stacking unit 40, each with a controlled, symmetrically removable plate support, connect to the two buffer stations 24 and 26 respectively. This support is in the two stacking units 38, 40 formed by, on the one hand, the movable belts 30 in the frame 31 of the upstream buffer station 24, 26 and, on the other hand, by a set of belts 42 which are fitted symmetrically relative thereto and are movable to and fro relative thereto, and which are driven around in the direction of the arrow 44 and accommodated in a frame 45 which is movable to and fro. Each stacking unit 38, 40 also has a fixed elongated plate stop 46. When sets of belts 30, on the one hand, and 42, on the other hand, are moved away from each other, a plate lying thereon is ultimately no longer supported and consequently falls down. So long as they bear a plate lying thereon, the belts 30 will always continue to exert a force on said plate in the direction of the arrow 33, i.e. to the right in the figure—even if they are moved with their frame 31 to the left—and this also applies to the belts 42; this means that a supported plate will always remain pressed positively against the stop 46 until the belts 30, 42 ultimately release said plate.

An additional buffer is fitted below the two stacking units 38, 40, said buffer consisting of two supports 48a, 48b which are movable to and fro and, being movable in the horizontal direction, can be taken into the vertical path of the plates falling down; they can be designed in such a way that they can be moved downwards stepwise as the number of plates resting thereon increases.

Situated below that is a receiving table 49 which is movable in the vertical direction and has two conveyor belts 50, 52 for discharging a completed stack 56 in the direction of the arrow 54 or in another direction, for example perpendicular to the plane of the drawing. Of course, this table will initially stand in the highest position and, as the stack of plates thereon grows, it will be moved downwards.

The installation operates as follows:

The individual plates, situated at a distance from each other, are, in line with each other, and thus successfully fed to the level switch station 14 which feeds the plates alternately to the buffer stations 24 and 26 respectively; in each of said stations a plate, such as the plate 4c, comes to rest against the stop, such as the stop 36. When the stacking unit adjacent to a buffer station has released a plate, the control (not shown) makes the frame 31 with the belts 30 move to the right and the frame 45 with the belts 42 move to the left; the stop 34, 36 is then released and the plate present in front of it slides, still fully supported, to the right until it is against the stop 46. If both stacking units 38, 40 contain a plate, the supporting belts 30, 42 of the top stacking unit are first drawn back, and the top plate 4d falls onto the bottom plate 4e; bottom belts 30, 42 are then drawn back, and both plates fall down together onto the stack 56 which is forming.

During the formation of this stack 56 the support 48a, 48b is opened. If the production process is a continuous, very rapid process, the supports 48a, 48b are temporarily taken into the vertical falling path of the plates during the discharge of a completed stack in the direction of the arrow 54, so that an intermediate stack is temporarily formed.

A stack with an even number of plates is formed in the manner described. Of course, with a suitable control of the buffer stations 24, 26 it is also possible to form stacks with an uneven number of plates.

What is claimed is:

1. Installation for stacking successively infed plates, comprising:

an infeed conveyor supporting the infed plates and moving said infed plates in a direction of plate conveyance, and a controlled level switch connected to the infeed conveyor and receiving said plates;

a number of buffer stations which are situated above one another, each said buffer station for receiving a portion of said plates from said level switch;

a stacking station with a number of stacking units above one another, each stacking unit including a frame extended from one of the buffer stations at a same vertical level, and each stacking unit having a controlled removable support vertically aligned with and separated by a respective gap from the respective end at the same level, a receiving support for receiving a completed stack of plates, said receiving support being alignable with said gaps and below said stacking units, infed plates being conveyed by way of the level switch alternately to the respective buffer stations and from there to the respective stacking units for support between said extended frames and said removable supports, the respective removable supports of the stacking units being released successively to permit stacked plates in said respective stacking unit to fall to said receiving support.

2. Installation according to claim 1, in which the receiving support is movable in a vertical direction.

3. Installation according to claim 1, in which the level switch comprises a conveyor having an infeed side and a downstream end, said conveyor being guided around two guide rollers situated at a distance from each other, the downstream end of said conveyor being rotatable in a vertical direction about an axis of one said guide roller that is situated at the infeed side.

4. Installation according to claim 1, wherein a plate support in a buffer station includes first and second endless belts placed alternately next to each other and driven around, the second belts being accommodated in said frame which is movable to and fro in said direction of plate conveyance, said plate in said buffer station being taken into the respectively connecting stacking unit and further including third endless conveyor belts which are driven around and are movable to and fro symmetrically relative to the second belts, each said buffer station being bounded by a controlled removable stop for the infed plate.

5. Installation according to claim 4, in which a circumferential speed of the second belts in said frame is higher than a speed of said frame during the return movement thereof in a direction opposite to said direction of plate conveyance.

6. Installation according to claim 1, comprising two buffer stations and two stacking units.

7. Installation according to claim 1, in which separations between successive infed plates is increased on the infed conveyor due to a speed of the infed conveyor that is higher than a speed of said plates when infed in use of said installation.

8. Installation according to claim 1, further comprising a controlled plate support situated between the stacking units and the receiving support, and forming a vertical buffer station for temporarily storing said stacked plates falling from said stacking units.

9. Installation according to claim 1, comprising means for discharging said stacked plates from said receiving support in a direction at an angle transverse to said direction of plate conveyance.

10. Installation for stacking successively infed plates, comprising:

an infed conveyor supporting the infed plates and moving said infed plates in a direction of plate conveyance, and a controlled level switch connected to the infeed conveyor and receiving said plates;

a number of buffer stations which are situated above one another, each said buffer station for receiving a portion of said plates from said level switch;

a stacking station with a number of stacking units above one another, each stacking unit connecting to one of the respective buffer stations, and each stacking unit having a controlled removable support, a receiving support for receiving a completed stack of plates, said receiving support being below said stacking units, infed plates being conveyed by way of the level switch alternately to the respective buffer stations and from there to the respective stacking units, the respective removable supports of the stacking units being released successively to permit stacked plates in said respective stacking unit to fall to said receiving support, wherein a plate support in a buffer station includes first and second endless belts placed alternately next to each other and driven around, the second belts being accommodated in a frame which is movable to and fro in said direction of plate conveyance, said plate in said buffer station being taken into the respectively connecting stacking unit and further including third endless conveyor belts which are driven around and are movable to and fro symmetrically relative to the second belts, each said buffer station being bounded by a controlled removable stop for the infed plate.

11. Installation according to claim 10, in which a circumferential speed of the second belts in said frame is higher than a speed of said frame during the return movement thereof in a direction opposite to said direction of plate conveyance.

12. Installation according to claim 10, in which the receiving support is movable in a vertical direction.

13. Installation according to claim 10, in which the level switch comprises a conveyor having an infeed side and a downstream end, said conveyor being guided around two guide rollers situated at a distance from each other, the downstream end of said conveyor being rotatable in a vertical direction about an axis of one said guide roller that is situated at the infeed side.

14. Installation according to claim 10, comprising two buffer stations and two stacking units.

15. Installation according to claim 10, in which separations between successive infed plates is increased on the infeed conveyor due to a speed of the infeed conveyor that is higher than a speed of said plates when infed in use of said installation.

16. Installation according to claim 10, further comprising a controlled plate support situated between the stacking units and the receiving support, and forming a vertical buffer station for temporarily storing said stacked plates falling from said stacking units.

17. Installation according to claim 10, comprising means for discharging said stacked plates from said receiving support in a direction at an angle transverse to said direction of plate conveyance.

* * * * *